(12) United States Patent
Ohkubo et al.

(10) Patent No.: US 7,363,835 B2
(45) Date of Patent: Apr. 29, 2008

(54) BALL SCREW APPARATUS

(75) Inventors: Tsutomu Ohkubo, Kanagawa (JP); Eiji Hayashi, Kanagawa (JP)

(73) Assignee: NSK Ltd., Tokyo (JP)

( * ) Notice: Subject to any disclaimer, the term of this patent is extended or adjusted under 35 U.S.C. 154(b) by 659 days.

(21) Appl. No.: 10/937,565

(22) Filed: Sep. 10, 2004

(65) Prior Publication Data
US 2005/0087031 A1   Apr. 28, 2005

(30) Foreign Application Priority Data
Sep. 10, 2003 (JP) .............. P.2003-318123
Jun. 16, 2004 (JP) .............. P.2004-177994

(51) Int. Cl.
*F16H 1/18* (2006.01)
(52) U.S. Cl. .................. 74/424.86; 74/424.87; 74/424.82
(58) Field of Classification Search ........... 74/424.71, 74/424.81, 424.82, 424.86, 424.87
See application file for complete search history.

(56) References Cited

U.S. PATENT DOCUMENTS

| 4,074,585 A | * | 2/1978 | Richaud et al. | .......... 74/424.87 |
| 4,677,869 A | * | 7/1987 | Mayfield | .......... 74/424.83 |
| 5,154,091 A | * | 10/1992 | Bianco | .......... 74/424.86 |
| 5,974,908 A | | 11/1999 | Shirai et al. | |
| 6,941,831 B2 | * | 9/2005 | Ohkubo | .......... 74/424.87 |
| 6,978,693 B2 | * | 12/2005 | Ohkubo | .......... 74/424.87 |

FOREIGN PATENT DOCUMENTS

| CN | 1240891 A | 1/2000 |
| JP | 63-132156 A | 6/1988 |
| JP | 11-351350 A | 12/1999 |
| JP | 2002-098212 A | 4/2002 |
| JP | 2002-276764 A | 9/2002 |
| JP | 2003-194175 A | 7/2003 |
| JP | 2003-232421 A | 8/2003 |

* cited by examiner

*Primary Examiner*—David M. Fenstermacher
(74) *Attorney, Agent, or Firm*—Sughrue Mion, PLLC (57) ABSTRACT

A ball screw apparatus includes: a screw shaft having a screw groove, a nut having a screw groove and holes, a number of balls rollably provided between the screw grooves, and a ball circulating member having an end portion to be fitted to the holes. The ball circulating member includes aside cap having leg portions to be fitted into the holes. Each of the leg portions contains a scooping up path or a returning path. The scooping up path and the retuning path are inclined with respect to outer peripheral faces of the leg portions. The holes include a slot substantially in parallel with directions of the screw grooves. The scooping up path and the returning path are directed substantially in a tangential direction of the screw shaft and inclined substantially toward a lead angle direction of the screw grooves.

11 Claims, 9 Drawing Sheets

BALL SCREW APPARATUS

BACKGROUND OF THE INVENTION

1. Field of the Invention

The present invention relates to a ball screw apparatus used in various industrial machines.

2. Background Art

In a feeding mechanism or the like of various industrial machines, as an apparatus of converting rotational movement into linear movement, a ball screw of a tube circulating type is used.

Figure 17:
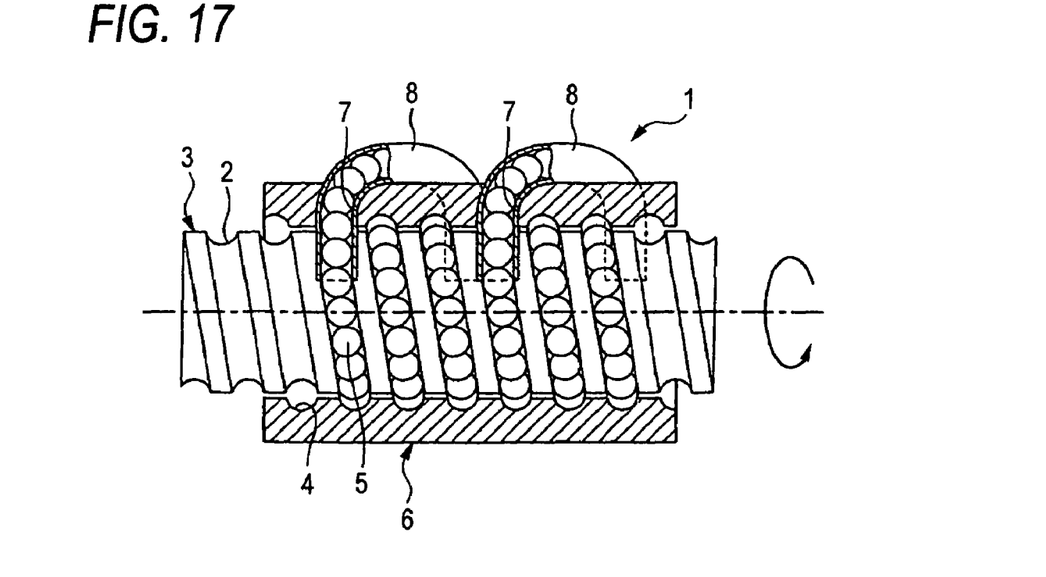
FIG. 17 is a sectional view showing an example of a circulating tube type ball screw apparatus of a related art.

FIG. 17 shows an example of a circulating tube type ball screw apparatus of a prior art, and according to the ball screw apparatus 1, a screw shaft 3 having a screw groove 2 in a spiral shape at an outer peripheral face thereof is screwed with a nut 6 having a screw groove 4 in a spiral shape in correspondence with the screw groove 2 at an inner peripheral face thereof.

The screw groove 4 of the nut 6 and the screw groove 2 of the screw shaft 3 are opposed to each other to form a load track in a spiral shape between the both members, and a number of balls 5 as rolling members are rollably charged to the load track. Further, by rotating the screw shaft 3 (or nut 6), the nut 6 (or screw shaft 3) is made to move in an axial direction via rolling of the balls 5.

Further, a portion of an outer peripheral face of the nut 6 is constituted by a flat face, the flat face is formed with a set of 2 pieces holes 7 communicated with the both screw grooves 2, 4 to ride over the screw shaft 3, and by fitting both ends of a circulating tube 8 substantially in a channel-like shape as an example of a ball circulating member to the set of holes 7, the balls 5 revolving along the load track between the both screw grooves 2, 4 are scooped up by the circulating tube 8 from a middle of the load track to return to the original track load, thereby, the balls 5 are infinitely circulated.

Meanwhile, according to the ball screw apparatus, as preload types, generally, there are an over size preload type (P) for applying preload by inserting a ball (steel ball) having a size larger than the screw groove by several μm, and a double nut preload type (D) and an offset lead preload type (Z) for applying preload by constituting the screw groove by a number of rows and slightly shifting leads of respective rows opposed to each other.

According to the double nut preload type (D), the nut is divided in two in an axial direction and therefore, cost is required for a fastening part and time is taken for operation of integrating the fastening part and therefore, particularly in the case of small lead, the offset lead preload type changing the lead at the middle of a single nut is frequently used.

As circulating types of the ball screw apparatus, other than the above-described circulating tube type, there are types referred to as a frame type and an end cap type and the types are generally provided with characteristics as shown by Table 1.

TABLE 1

|  | Tube type | Frame type | End cap type |
| --- | --- | --- | --- |
| Number of turns per row | A number of turns possible | Only one turn possible | A number of turns impossible |
| Multi-circuit formation | Possible | Possible | Impossible |
| Preload type | D, Z, P | D, Z, P | P (Z, D) |

TABLE 1-continued

|  | Tube type | Frame type | End cap type |
| --- | --- | --- | --- |
| Adaptability of lead | Small-middle lead | Adaptable to small lead | Adaptable to large lead |

Although high speed formation or high rated load formation is requested for a ball screw apparatus and therefore, it is necessary to increase a number of balls bearing a load, on the other hand, when an excessively large number of balls are put into one row of a circuit, the circulating types of the frame type and the end cap type which are disadvantageous in view of operability in which balls are rubbed by each other, it is difficult to make high rated load formation and operational property or the like compatible with each other in view of the respective characteristics shown in Table 1.

Meanwhile, the circulating tube type is an external circulating type capable of constituting multi-row formation by completely separating the ball from the screw groove of the nut from the direction of a side face of the nut, the circulating tube type is a circulating type preferable for high rated load formation of particularly, a small lead product.

Further, with high rotation formation of a ball screw apparatus, a speed of impacting the ball to the circulating tube is accelerated. When the impact speed is accelerated, and impact energy is increased, the circulating tube or the screw groove (including both shoulder portions of the screw groove) is destructed to hamper high speed formation and therefore, there is proposed a ball screw apparatus in which a direction of scooping up the ball by the circulating tube is inclined substantially in a tangential direction of the screw shaft and substantially in a direction of a lead angle.

However, when the ball is intended to scoop up in the tangential direction of the screw shaft and in the direction of the lead angle of the screw shaft, the circulating tube is constituted by a complicated shape (Z type instead of simple channel-like type), and when holes opened at the flat face of the nut are simple spot facing holes, the both end portions of the circulating tube cannot be fitted thereto.

Figure 18:
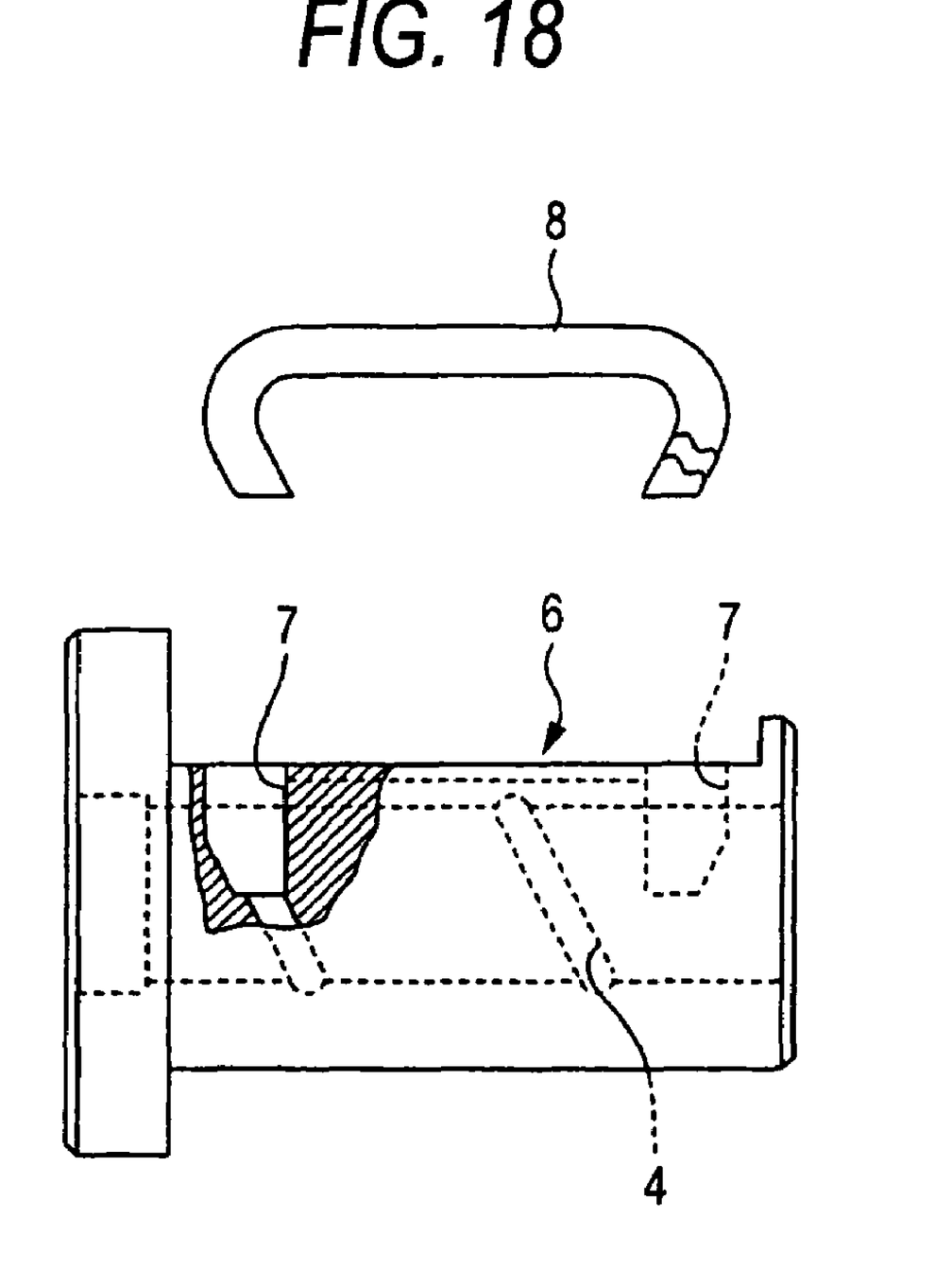
FIG. 18 is a view breaking a portion showing a nut and a circulating tube of a circulating tube type ball screw apparatus of other example of a related art.

Hence, in the prior art, as shown by FIG. 18, there is adopted a method of subjecting the hole 7 formed that the flat face of the nut 6 to spot facing to a considerable degree or working the hole 7 skewedly (in tangential direction) (refer to, for example, JP-UM-A-63-132156).

Incidentally, in a general ball screw, a circulating tube made of a metal is used as a member of circulating a ball, the ball is scooped up to outside of a nut at a tongue portion provided at an end portion of the circulating tube and therefore, there is a difficulty of bringing about vibration, noise or the like when the ball is impacted to the tongue portion of the circulating tube.

Hence, there is proposed a ball screw of a type (hereinafter, referred to as "tangential scooping up type") using a ball circulating member made of a resin as a member for circulating a ball and scooping up the ball rolling between ball screw grooves of a screw shaft and a nut in a direction of a tangential line brought into contact with a center track circle of a ball by a tongue portion of the ball circulating member to circulate at outside of the nut (refer to JP-A-2003-232421).

SUMMARY OF THE INVENTION

According to the ball screw apparatus described in JP-UM-A-63-132156, mentioned above, there poses a problem that working of the hole 7 formed at the flat face of the nut 6 becomes complicated, further, since the hole 7 is large, a screw groove having a small lead or a small pitch as in a multi-streak screw is interfered with a contiguous screw groove.

Although the ball screw described in JP-A-2003-232421 can restrain vibration, noise or the like from being brought about in comparison with that of the above-described tube circulating system. In recent years, it is requested to promote high speed formation and durable life of a ball screw and therefore, in order to meet the request, it is necessary to increase strength of a tongue portion by thickening a thickness (thickness along a longitudinal direction of the ball screw groove) of the tongue portion of the ball circulating member. However, when the thickness of the tongue portion is thickened, a hole diameter of a circulating member inserting hole formed at the nut is increased to interfere with the ball screw groove of the nut and therefore, when a pitch of the ball screw groove is small or when the ball screw groove is a multi-streak screw groove, it is difficult to thicken the thickness of the tongue portion.

The invention has been carried out in order to resolve such drawbacks. It is an object of the invention to provide a ball screw apparatus capable of easily realizing to scoop up a ball substantially in a tangential direction and substantially in a lead angle direction and capable of adapting also to a screw groove having a small lead or a small pitch as in the multi-streak screw.

It is another object of the invention to provide a ball screw capable of increasing strength of a tongue portion by thickening a thickness of a tongue portion of a ball circulating member even when a pitch of a ball screw groove is small or when a ball screw groove is a multi-streak screw groove.

The invention provides a ball screw apparatus, including: a screw shaft having a screw groove in a spiral shape at an outer peripheral face thereof; a nut having a screw groove in a spiral shape in correspondence with the screw groove of the screw shaft at an inner peripheral face thereof and screwed to the screw shaft, the nut having holes formed at an outer peripheral portion thereof; a number of balls rollably charged into a rolling passage that is defined by the screw groove of the screw shaft and the screw groove of the nut; and a ball circulating member formed substantially in a U-like shape and having end portions to be fitted to the holes to infinitely circulate the balls by scooping up the balls rolling on the rolling passage at a middle thereof and returning the balls to the rolling passage; wherein the ball circulating member comprises a side cap which includes leg portions at both end portions thereof to be fitted into the holes, each of the leg portions containing at least one of a scooping up path for scooping up the balls and a returning path for returning the balls, the scooping up path and the retuning path being inclined with respect to respective outer peripheral faces of the leg portions; the holes include a slot substantially in parallel with directions of the screw grooves of the screw shaft and the nut; and the scooping up path and the returning path are directed substantially in a tangential direction of the screw shaft and inclined substantially toward a lead angle direction of the screw grooves of the screw shaft and the nut.

Preferably, a sidewall of the slot is used as a portion of a path for circulating the ball.

Preferably, a width dimension of the slot substantially the same as a diameter of the scooping up path and the returning path at a vicinity of a scoop up point where the balls are separated from the screw groove of the screw shaft.

Preferably, an apparent scoop up angle is set from 20° to 45°, wherein the apparent scoop up angle is an angle of scooping up the balls viewed in an axis direction of the screw shaft at a scoop up point where the balls are separated from the screw groove of the screw shaft.

The invention provides a ball screw, including: a screw shaft having a ball screw groove formed on an outer peripheral face thereof; a nut having a ball screw groove formed on an inner peripheral face thereof so as to be opposed to the ball screw groove of the screw shaft; a number of balls provided between the ball screw groove of the screw shaft and the ball screw groove of the nut; and a ball circulating member made of a resin for circulating the balls rolling between the ball screw grooves of the screw shaft and the nut in accordance with a rotational movement of the screw shaft or the nut at an exterior of the nut; wherein the ball circulating member includes: a tongue portion for scooping up the ball rolling between the ball screw grooves of the screw shaft and the nut in a direction of a tangential line that is in contact with a center track circle of the balls, a ball return path for circulating the ball, and a pair of return path inlet and outlet forming portions for forming inlet and outlet portions of the ball return path; the nut includes a circulating member inserting hole fitted to the return path inlet and outlet forming portion; and a circulating member inserting hole is formed in an oval shape that is longitudinal along a longitudinal direction of the ball screw groove; and a thickness of the tongue portion along a length direction of the ball screw groove is equal to or larger than ½ of a diameter of the ball.

Preferably, a shape of the tongue portion is formed substantially the same as a shape of the ball screw groove of the screw shaft.

Preferably, an angle of intersecting a straight line passing a point of scooping up a ball scooped up from the screw groove of the screw shaft and a center of the screw shaft with a center line of the circulating member inserting hole is made to be 45° through 80°.

Preferably, the ball return path includes linear path portions having a length equal to or larger than ½ of the diameter of the ball at both end portions thereof.

The invention provides a ball screw, including: a screw shaft having a first screw groove in a spiral shape at an outer peripheral face thereof; a nut having a second screw groove in a spiral shape at an inner peripheral face thereof in correspondence with the first screw groove and screwed to the screw shaft, the nut having slots; a plurality of balls rollably provided into a rolling passage that is defined between the first screw groove and the second screw groove; and a side cap having leg portions to be fitted into the slots to infinitely circulate the balls by scooping up the balls rolling on the rolling passage at a middle thereof and returning the balls to the rolling passage; wherein the slots are longitudinal in a direction inclined toward an apparent scoop up angle so that a longitudinal direction of each of the slots is substantially equal to a tangent scooping up direction, wherein the apparent scoop up angle is an angle of scooping up the balls viewed in an axis direction of the screw shaft at a scoop up point where the balls are separated from the first screw groove; and the apparent scoop up angle is set from 20° to 45°.

Preferably, the side cap includes a circulating path for circulating the balls, and a tongue portion for guiding the balls from the rolling passage to the circulating path; the tongue portion extends in a direction substantially equal to the longitudinal direction of at least one of the slots; and the tongue portion has a length equal to or more than a halt of a diameter of each of the balls.

Preferably, the side cap has a linear portion extending from the scoop up point toward the circulating path; and the linear portion has a length equal to or more than a half of a diameter of each of the balls.

BRIEF DESCRIPTION OF THE DRAWINGS

The present invention may be more readily described with reference to the accompanying drawings.

DETAILED DESCRIPTION OF THE PREFERRED EMBODIMENTS

The First Preferred Embodiment

Figure 1:
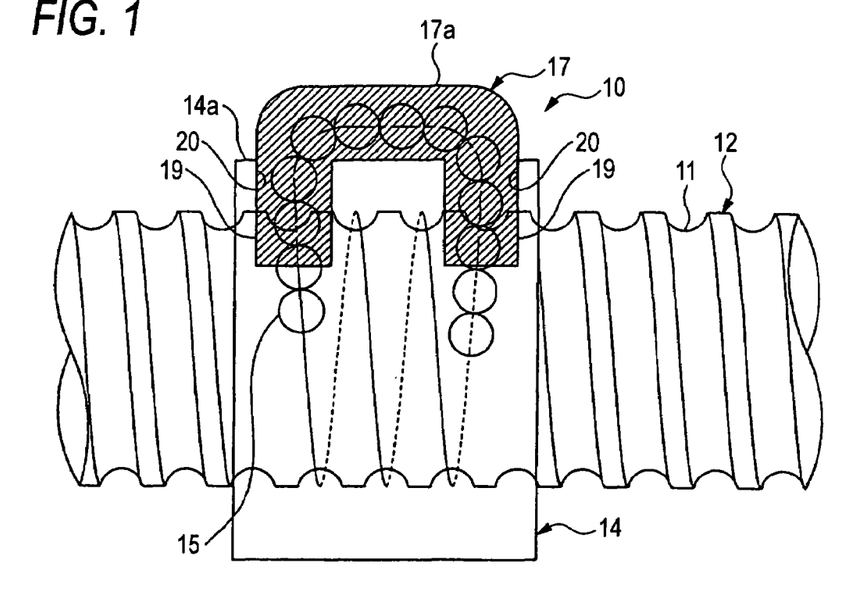
FIG. 1 is an explanatory view for explaining a ball screw apparatus constituting an example of an embodiment of the invention.
Figure 3:
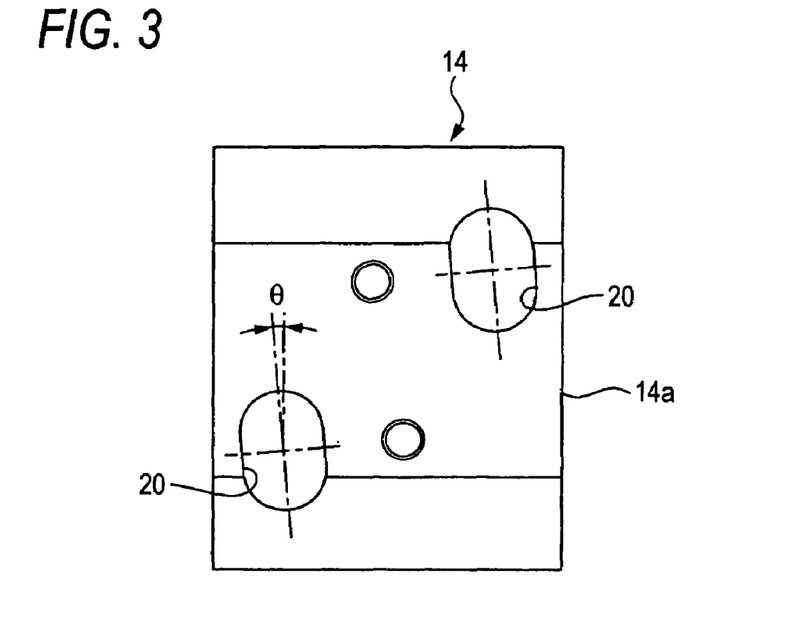
FIG. 3 is a plane view of a nut before being mounted to a side cap.
Figure 4:
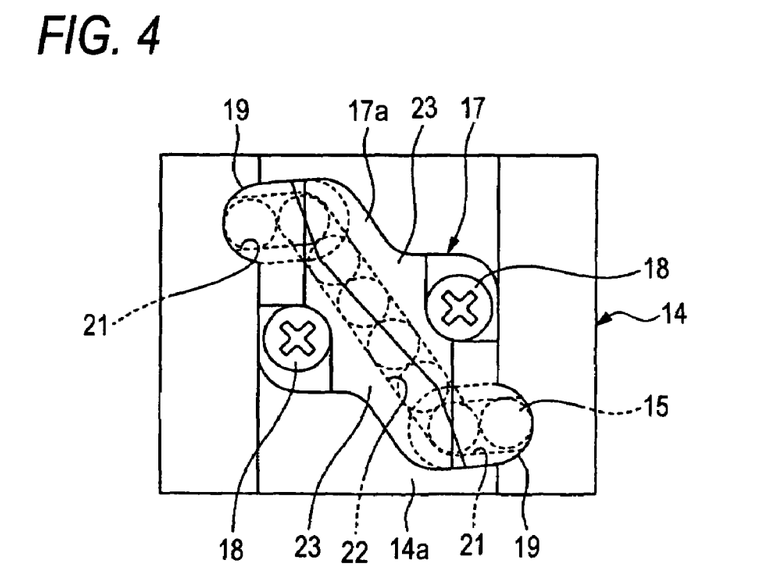
FIG. 4 is a view viewing FIG. 2 from above.
Figure 5:
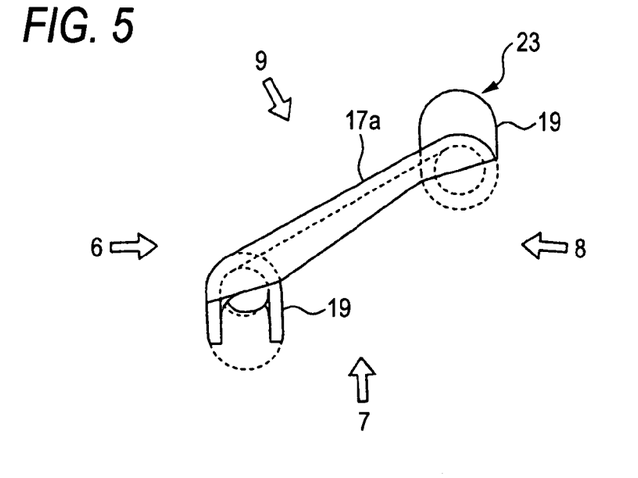
FIG. 5 is a view showing a side cap split member splitting the side cap in point symmetry.
Figure 6:
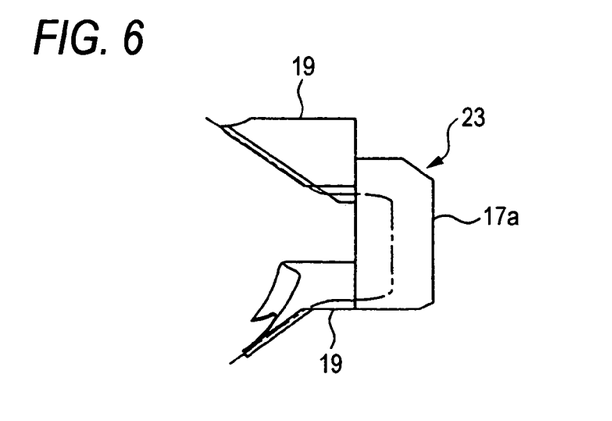
FIG. 6 is a view viewing from an arrow mark 6 direction of FIG. 5.
Figure 7:
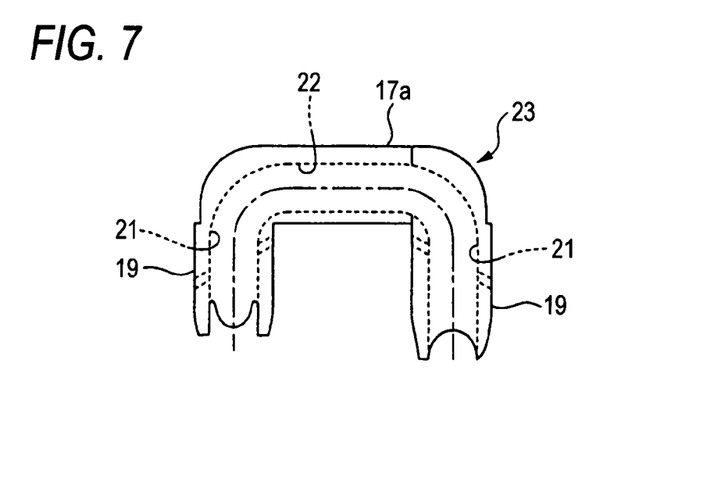
FIG. 7 is a view viewing from an arrow mark 7 direction of FIG. 5.
Figure 8:
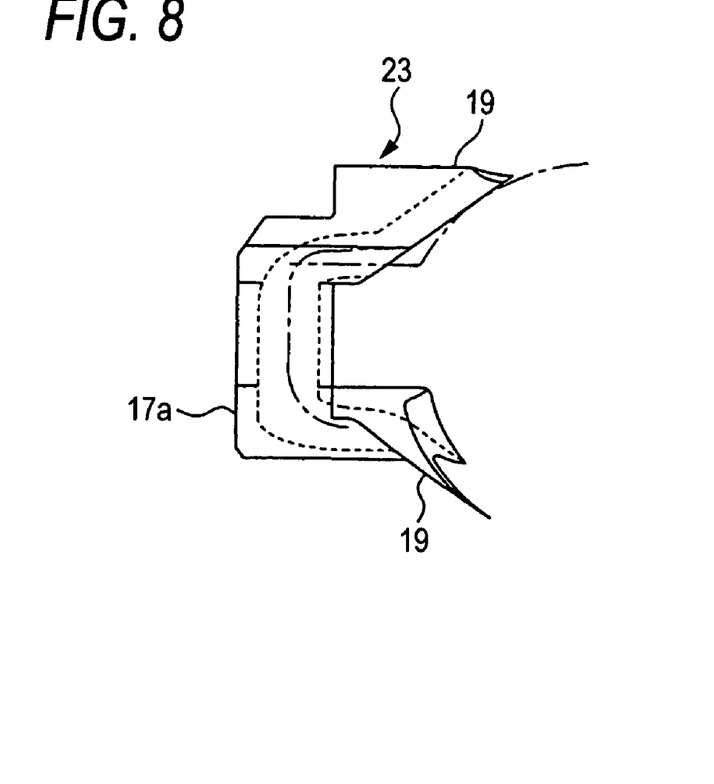
FIG. 8 is a view viewing from an arrow mark 8 direction of FIG. 5.
Figure 9:
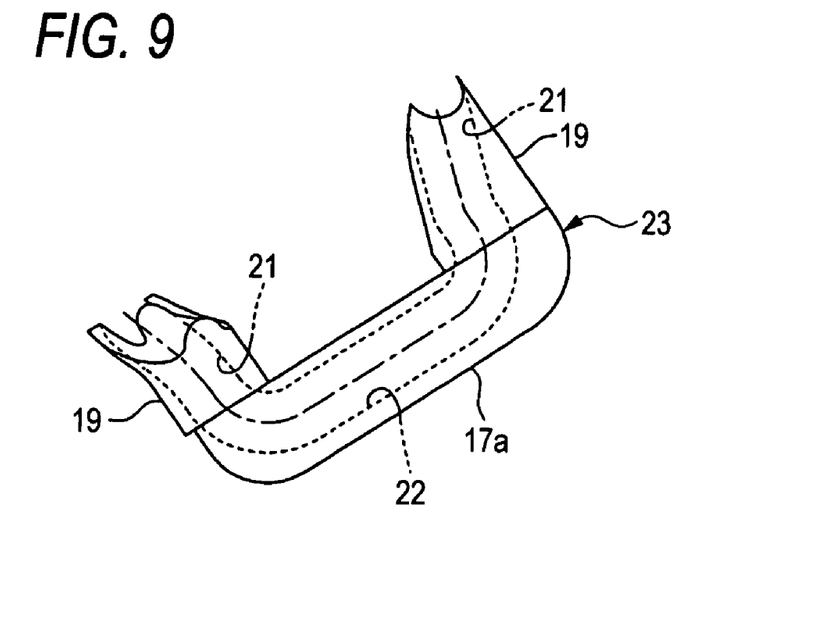
FIG. 9 is a view viewing from an arrow mark 9 direction of FIG. 5.
Figure 10:
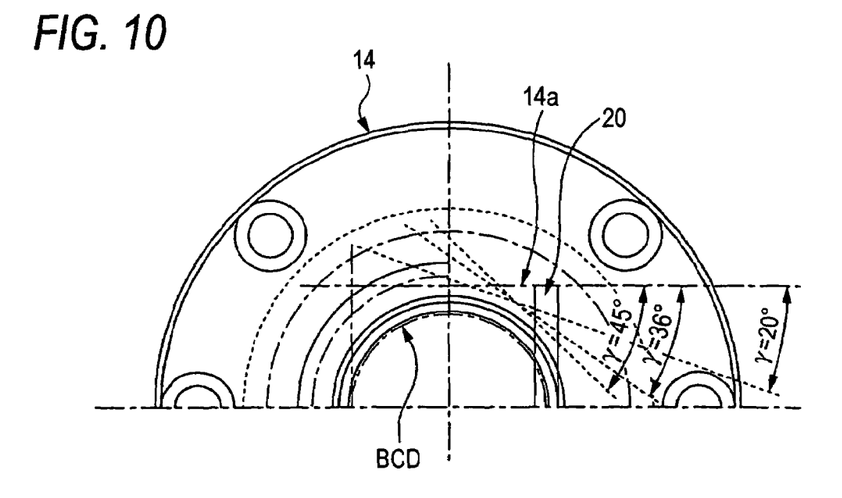
FIG. 10 is an explanatory view for explaining an apparent scoop up angle.

An explanation will be given of an example of an embodiment of the invention in reference to the drawings as follows. FIG. 1 is an explanatory view for explaining a ball screw apparatus constituting the example of the embodiment of the invention, FIG. 2 is a sectional view in a diameter direction of FIG. 1, FIG. 3 is a plane view of a nut before being mounted to a side cap, FIG. 4 is a view viewing FIG. 2 from above, FIG. 5 is a view showing a side cap slit member splitting the side cap in point symmetry, FIG. 6 is a view viewing FIG. 5 in an arrow mark 6 direction, FIG. 7 is a view viewing FIG. 5 in an arrow mark 7 direction, FIG. 8 is a view viewing FIG. 5 from an arrow mark 8 direction, FIG. 9 is a view viewing FIG. 5 from an arrow mark 9 direction, and FIG. 10 is an explanatory view for explaining an apparent scoop up angle.

Figure 2:
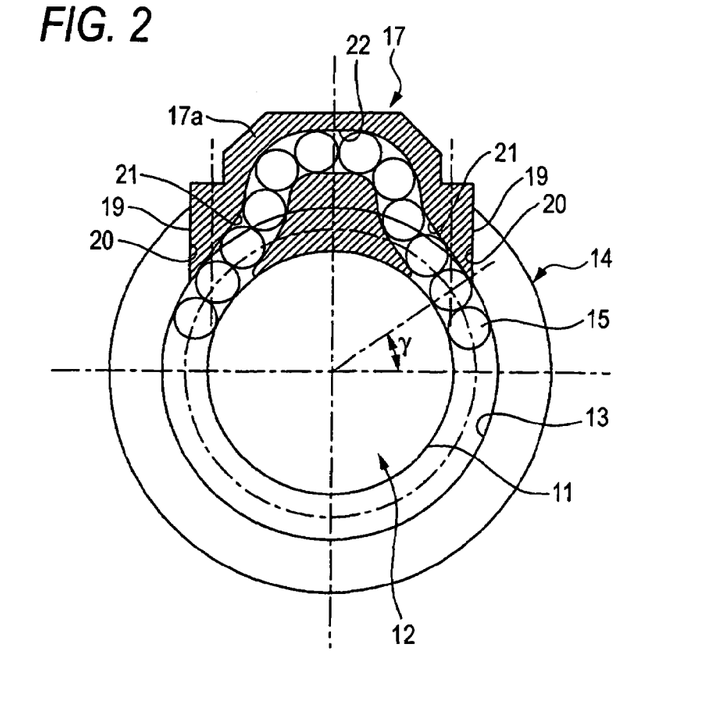
FIG. 2 is a sectional view in a diameter direction of FIG. 1.

According to a ball screw apparatus 10 constituting one example of the embodiment of the invention, as shown by FIG. 1 and FIG. 2, a screw shaft 12 having a screw groove 11 in a spiral shape at an outer peripheral face thereof is fitted with a nut 14 having a screw groove 13 in correspondence with the screw groove 11 at an inner peripheral face thereof, and the screw groove 13 of the nut 14 and the screw groove 11 of the screw shaft 12 are opposed to each other to form a load track in a spiral shape between the both members. A number of balls 15 as rolling members are rollably charged to the load track, and by rotating the screw shaft 12 (or nut 14), the nut 14 (or screw shaft 12) is made to move in an axial direction via rolling of the balls 15.

A portion of an outer peripheral face of the nut 14 is formed with a flat face 14a, and the flat face 14a is fixed with a side cap 17 constituted by bonding a pair of side cap split members 23 to each other by a fixing member of, for example, a screw 18 or the like as shown by FIG. 4 through FIG. 9. Further, the side cap split member 23 is fabricated by molding a resin or forming a metal or the like.

The side cap 17 is provided with a cap main body 17a and a pair of leg portions 19 of a columnar shape, a block-like shape or the like provided on a side of a lower face of the cap main body 17a and extended in a direction orthogonal to an axial direction of the screw shaft 12, and the pair of leg portion 19 are arranged to separate from each other in the axial direction of the screw shaft 12 and separate from each other in a diameter direction of the screw shaft 12.

The leg portions 19 communicate with the load track between the screw grooves 11, 13 to fit to a set of two pieces of oval holes 20 (refer to FIG. 3) bored to the flat face 14a of the nut 14, and in such a fitting state, the cap main body 17a is fixed to the nut 14 by fixing means of the screw 18 or the like. Further, in the fixing, it is advantageous also in view of noise when the cap main body 17a is pressed by an object having a shape of a cover covering a total of the side cap.

Further, inside of each of the leg portion 19 of the side cap 17 is formed with a ball scoop up (or ball return) path 21 extended substantially in a tangential direction of the screw shaft 12 and in a direction substantially coinciding with a lead angle of the two screw grooves 11, 13, and inside of the cap main body 17a is formed with a ball path 22 connecting the respective ball scoop up paths 21.

Further, inside of the side cap 17 is formed with a ball circulating path for scooping up the ball 15 rolling one (or other) load track in the axial direction between the two screw grooves 11, 13 to return to other (or one) load track in the axial direction by respectives of the ball scoop up path 21 and the ball path 22.

A point of the side cap type ball screw apparatus 10 different from the ball screw apparatus (tube type or the like) of the prior art resides in that while simply fitting the pair of leg portions 19 to the oval holes 20 formed at the flat face 14a of the nut 14 without a clearance therebetween, a direction of the ball scoop up path 21 formed at inside of the leg portion 19 can be inclined to an outer peripheral face of the leg portion 19.

Therefore, as in the circulating tube type ball screw apparatus of the prior art, the flat face 14a of the nut 14 is worked with the oval holes 20 in the direction orthogonal to the screw shaft 12, while constituting a structure of simply fitting the leg portions 19 of the side cap 17 to the oval holes 20, a direction of advancing the ball 15 of the ball scoop up path 21 formed at inside of the leg portion 19 can be inclined substantially in the tangential direction of the screw shaft 12 and the direction substantially coinciding with the lead angle of the two screw grooves 11, 13, thereby, fabrication of the nut 14 is simplified, and a degree of freedom of design of the scoop up path and the return path of the ball 15 can be promoted. Further, the cost can be reduced by molding the side cap by a resin or the like.

Here, according to the embodiment, the oval hole 20 is constituted by a shape prolonged not in a direction (axial direction) interfering with the contiguous screw groove 13 of the nut 14 but prolonged substantially in the lead angle direction of the two screw grooves 11, 13 as shown by FIG. 3, a side wall of the oval hole 20 is used as a portion of the path of circulating the ball 15, and an apparent scoop up angle γ, mentioned later, is made to be 20 through 45°.

In reference of FIG. 10, when an ideal scoop up path (hereinafter, referred to as tangential scoop up path) for linearly inclining the direction of advancing the ball 15 in the tangential direction of the screw shaft 12 and in the direction coinciding with the lead angle of the two screw grooves 11, 13 is formed at inside of the leg portion 19, the path is not orthogonal to the flat face 14a of the nut 14. Therefore, according to the ball screw apparatus of the prior art, it is necessary to bore a hole at the flat face of the nut by inclining a working tool for ensuring the path.

To avoid the inclined working, according to the invention, there is conceived a shape of the oval hole 20 orthogonal to the flat face 14a of the nut 14 and prolonged in the direction of the lead angle incorporating the ideal path.

First, an angle of the flat face 14a of the nut 14 is changed without changing the tangential scoop up path relative to the screw groove 13 of nut 14. When a normal scoop up angle is changed while maintaining the tangential scoop up state, a shape of the oval hole 20 is changed.

By constituting the apparent scoop up angle γ (an angle viewing a scoop up point at which the ball 15 is separated from the screw groove 11 of the screw shaft 12 from an axial center of the screw shaft 12: refer to FIG. 2) by the scoop up angle in this case and by utilizing the fact that by increasing the apparent scoop up angle γ, the oval hole 20 is made to be difficult to interfere with the contiguous screw groove 13 of the nut 14 by increasing the apparent scoop up angle γ, it is realized to carry out tangential scoop up capable of adapting to a screw groove having a small lead or a small pitch as in multi-streak screw.

Next, consider what relationship is established between the shape of the oval hole 20 and the contiguous screw groove 13 of the nut 14 when the apparent scoop up angle γ is changed.

When the apparent scoop up angle γ is 0°, the oval hole 20 is constituted by a shape a direction of which is prolonged in a direction in parallel with the axial line of the nut 14, naturally, there is a high possibility of interfering the oval hole 20 with the contiguous screw groove 13 of the nut 14, which is not realistic.

It has been found that when the apparent scoop up angle γ is 36°, a longitudinal direction of the oval hole 20 becomes substantially in parallel with the screw groove 13 of the nut 14 (lead angle direction), and interference with the contiguous screw groove 13 of the nut 14 is restrained even when a width of the oval hole 20 is more or less increased. The shape of the oval hole 20 in this case constitutes a minimum oval hole incorporating the above-described ideal path and a minimum path incorporating the path of circulating the ball 15.

Further, by using the side wall of the oval hole 20 as a portion of the path of circulating the ball 15 by making a width dimension of the oval hole 20 substantially the same as a diameter of the scoop up path 21 at a vicinity of a scoop up point at which the ball 15 is separated from the screw groove 11 of the screw shaft 12, the screw groove 13 on the side of the nut 14 and the screw groove 11 on the side of the screw shaft 12 can firmly be positioned, thereby, the ball 15 follows a locus in which the ball 15 is smoothly brought into the screw groove 11 of the screw shaft 12 by being constrained in the direction of the lead angle and therefore, impact of the ball 15 to the screw groove 11 (including both shoulder portion) is restrained and high speed durability and low noise formation can be realized. In this case, by setting as described above, the diameter of the ball 15 can be constituted to be equal to or larger than 65% of the groove pitch of the screw grooves 11, 13 and high rated load formation can be constituted by large diameter formation of the ball diameter.

In this way, the larger the apparent scoop up angle γ, the more proximate is the longitudinal direction of the oval hole 20 to be in parallel with the screw groove 13 of the nut 14 and interference with the contiguous screw groove 13 is restrained. However, when the apparent scoop up angle γ becomes excessively large by exceeding 45°, the oval hole 20 and therefore, the side cap 17 become proximate to a side of a center of the flat face 14a and therefore, there is a concern of interfering with the contiguous screw groove in the case of the small pitch.

Therefore, when the apparent scoop up angle γ falls in the range between 20° through 45°, even in a specification of a small pitch, setting of avoiding interference with the contiguous screw groove can be constituted, the oval hole becomes a simple shape and therefore, the oval hole can easily be worked. An angle θ of the oval hole (refer to FIG. 3) can be constituted by θ=0 further facilitating to work when there is not an interference between the groove and the oval hole in the case of a specification (lead, ball diameter) in which a pitch between the grooves becomes large.

The tangential scoop up, mentioned here, does not limit both of the scoop up angle γ and the lead angle to a complete tangential direction but a deviation of about ±10° does not effect a significant adverse influence in view of noise or the like. Therefore, a path of scoop up may be set such that the scoop up is carried out by about ±10° in the tangential direction by design specification. Further, when a dimension of a stepped difference between the screw groove and the scoop up path is increased, sound of the ball in riding over the stepped difference is increased, an adverse influence is effected in view of noise and durability and therefore, it is preferable to restrain the dimension of the stepped difference to about 2% of the ball diameter.

According to the invention, there is used the side cap which is provided with the leg portions fitted to the holes of the nut at the both end portions and in which the path of scooping up and the path of returning the ball are formed to be inclined respectively to the outer peripheral faces of the leg portions as the ball circulating member and therefore, it can easily be realized that the ball is scooped up substantially in the tangential direction and substantially in the lead angel direction.

Further, the hole is constituted by the oval hole prolonged not in a direction (axial direction) of interfering with the contiguous screw groove but prolonged in the lead angle direction of the two screw grooves and therefore, the ball screw apparatus can be adapted to the screw groove having a small lead or a small pitch as in a multi-streak screw, working of the hole on the side of the nut is simplified and low cost formation can be achieved.

According to the invention, by using the side wall of the oval hole as a portion of the path of circulating ball, the screw groove on the side of the nut and the screw groove on the side of the screw shaft can firmly be positioned, thereby, the ball follows a locus smoothly brought into the screw groove of the screw shaft by being constrained in the lead angle direction and therefore, high speed durability and low noise formation can be realized.

According to the invention, by constituting the apparent scoop up angle by 20° through 45°, the direction of the oval hole becomes proximate to a spiral direction of the screw groove and therefore, interference between the oval hole and a load groove (groove of passing ball) can be avoided, thereby, the ball screw apparatus can deal with a smaller lead and a smaller (lead/ball diameter).

The Second Preferred Embodiment

An explanation will be given of a second embodiment of the invention in reference to the drawings as follows.

Figure 11:
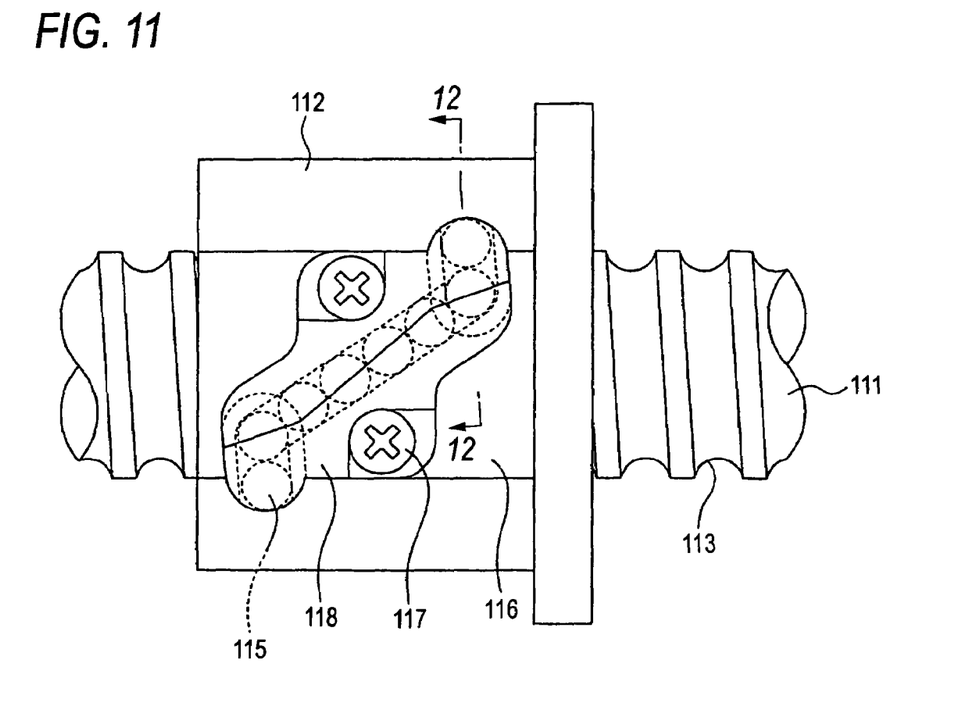
FIG. 11 is a plane view of a ball screw according to an embodiment of the invention.

An embodiment of a ball screw according to the invention is shown in FIG. 11 through FIG. 15. In FIG. 11, notation 111 designates a screw shaft, notation 112 designates a nut, and a ball screw groove 113 is formed at an outer peripheral face of the screw shaft 111. The ball screw groove 113 is opposed to a ball screw groove 114 (refer to FIG. 12) formed at an inner peripheral face of the nut 112; and a number of balls 115 as rolling members are provided between the two small screw grooves 113, 114. The balls 115 are constituted to roll on groove faces of the ball screw grooves 113, 114 in accordance with rotational movement of the screw shaft 111 or the nut 112, and a plane portion 116 formed at an outer peripheral face of the nut 112 is attached with a ball circulating member 118 for circulating the balls 115 rolling between the ball screw grooves 113, 114 at outside of the nut 112 by two pieces of screws 117. Further, in the case of using a ball having a large diameter or in the case of a ball screw used for high speed use, the ball screw member 118 made of a resin may be fixed by a holder made of a metal serving also as a cover.

The ball circulating member 118 includes a ball return path 181 (refer to FIG. 12) and a pair of return path inlet and outlet forming portions 182 (refer to FIG. 13) forming inlet and outlet portions of the ball return path 181, and the ball 115 rolled between the ball screw grooves 113, 114 is made to return to an original position by passing the ball return path 181 of the ball circulating member 118.

Figure 12:
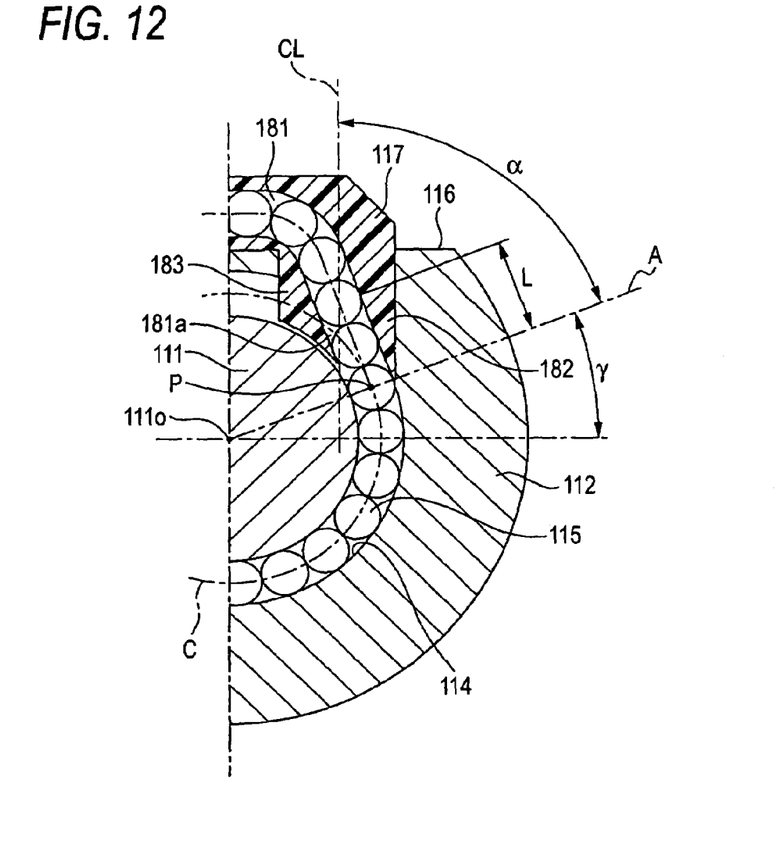
FIG. 12 is a sectional view taken along a line 12-12 of FIG. 11.
Figure 13:
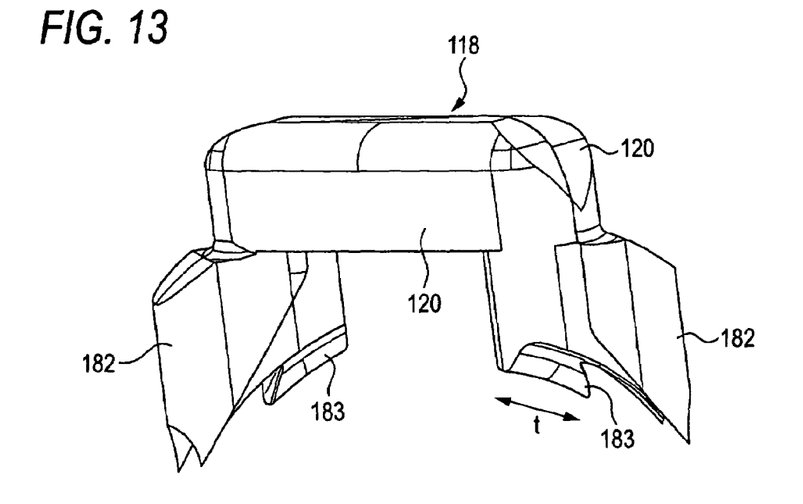
FIG. 13 is a perspective view of a ball circulating member made of a resin shown in FIG. 11.
Figure 14:
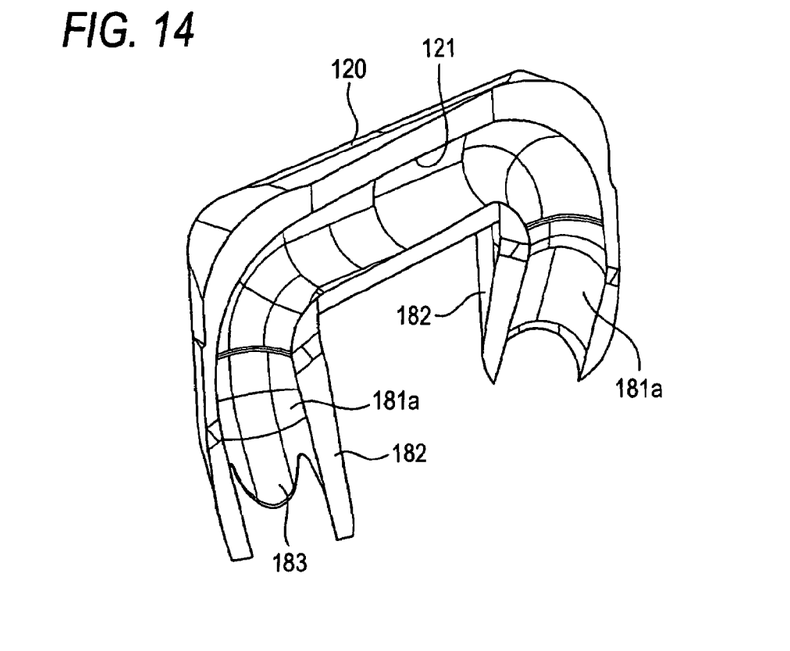
FIG. 14 is a view showing a ball return path formed at the ball circulating member made of a resin of FIG. 13.
Figure 15:
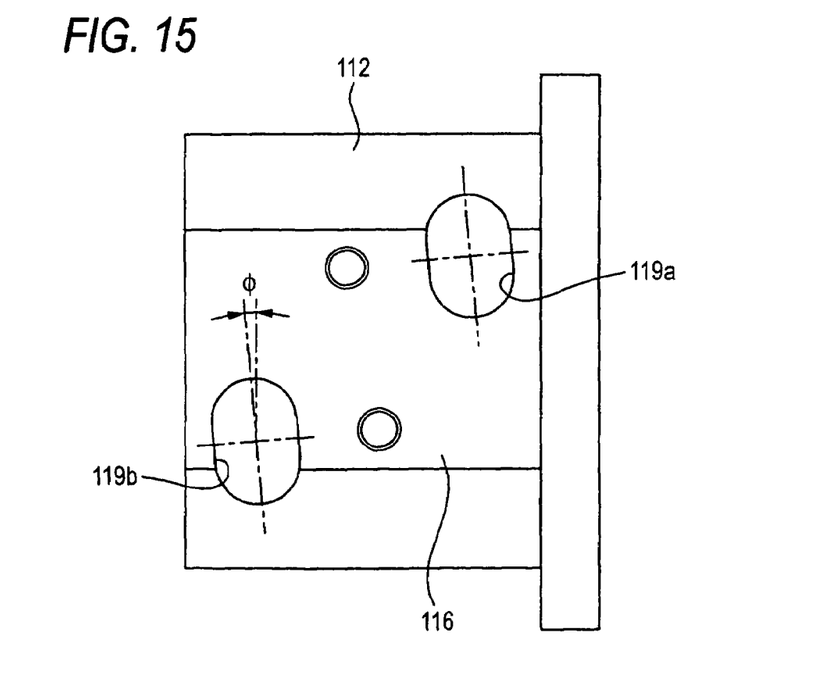
FIG. 15 is a plane view of a nut shown in FIG. 11.

Further, the ball circulating member 118 includes a pair of tongue portions 183 (refer to FIG. 13) for scooping up the ball 115 rolled between the ball screw grooves 113, 114 in a direction of a tangential line brought into contact with a center track circle C (refer to FIG. 12). The tongue portions 183 are provided at front end portions of the return path inlet and outlet forming portions 182 such that a clearance is formed between the tongue portion 183 and the screw shaft side ball screw groove 113, and a thickness t (refer to FIG. 13) of the tongue portion 183 along a longitudinal direction of the ball screw groove 114 becomes equal to or larger than ½ of a diameter of the ball 115. Further, a sectional shape of the tongue portion 183 along a width direction is formed by a shape substantially the same as that of the ball screw groove 113 of the screw shaft 111 and is arranged to constitute a clearance between the tongue portion 183 and the ball screw groove 113.

The nut 112 includes circulating member inserting holes 119a, 119b (refer to FIG. 15) fitted to the return path inlet and outlet forming portions 182 of the ball circulating member 118, and the circulating member inserting holes 119a, 119b are formed in an oval shape along a longitudinal direction of the ball screw groove 114 to avoid interference with the ball screw groove 114.

The ball 115 is made to be scooped up from the ball screw groove 113 of the screw shaft 111 at a point P of scooping up the ball, and a straight line A passing the ball scooping up point P and a center 110 of the screw shaft 111 is intersected with a center line CL of the circulating member inserting hole 119a, 119b by an angle of α=45° through 80°.

The ball return path 181 includes linear path portions 181a (refer to FIG. 13) at both end portions thereof and a length L of the linear path portion 181a becomes equal to or larger than ½ of the diameter of the ball 115.

Further, the ball circulating member 118 is formed by two of resin molded members 120 (refer to FIG. 13) and each of the resin molded members 120 is provided with a ball return path forming groove 121 forming the ball return path 181.

According to the ball screw constituted in this way, the circulating member inserting holes 119a, 119b are formed in the oval shape along the longitudinal direction of the ball screw groove 114 and therefore, even when the thickness of the tongue portion 183 of the ball circulating member 118 is thickened, the circulating member inserting holes 119a, 119b can be prevented from being interfered with the ball screw groove 114. Therefore, strength of the tongue portion 183 can be increased by thickening the thickness of the tongue portion 183 of the ball circulating member 118 even when a pitch of the ball screw groove 114 is small or when the ball screw groove 114 is a multi-streak screw groove, and high speed formation and durable life of the ball screw can be promoted.

Further, according to the above-described embodiment, by constituting the thickness t of the tongue portion 183 along the longitudinal direction of the ball screw groove 114 to be equal to or larger than ½ of the diameter of the ball 115, the tongue can be prevented from being destructed and high speed formation of the ball screw can be achieved.

Figure 16:
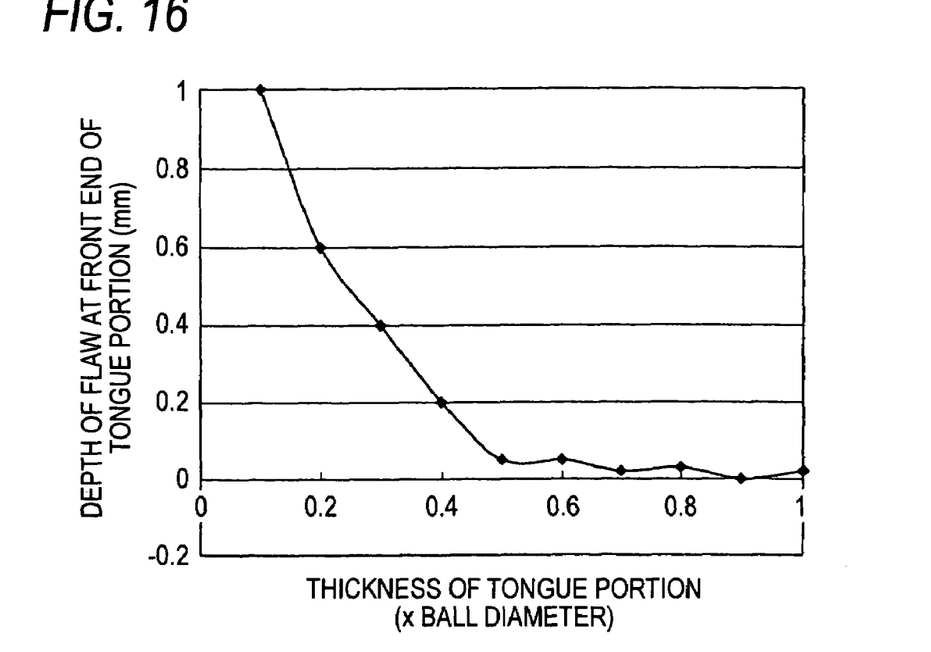
FIG. 16 is a diagram showing a relationship between a thickness of a tongue portion and a depth of a flaw at a front end of the tongue portion.

FIG. 16 shows a result of measuring a depth of a flaw at the front end of the tongue portion under test conditions of a ball screw revolution speed: 3200 $min^{-1}$, and a nut running distance: 1 km by using a ball screw (shaft diameter of 63 mm, lead of 16 mm) having the thickness t of the tongue portion of t=0.1 Da (Da=ball diameter), 0.2 Da, 0.3 Da, 0.4 Da.

According to a test result of FIG. 16, a flaw is brought about at the front end of the tongue portion when a revolution speed of the ball screw is at high speed and the thickness of the tongue portion is thin. On the other hand, it has been found that when the thickness of the tongue portion is thick, the flaw is difficult to be brought about at the front end of the tongue portion and when the thickness of t of the tongue portion becomes equal to or larger than t=0.5 Da, the flaw is hardly brought about at the front end of the tongue portion. It seems to be that the strength of the tongue portion is increased by thickening the thickness of the tongue portion and when the tongue portion is brought into contact with the screw shaft or the like, the tongue portion is brought into contact therewith by a wide area and therefore, influence of the flaw or the like is difficult to be brought about. At a normal revolution speed (for example, 1600 $min^{-1}$), also the flaw is not found from about 0.2 mm of the thickness t of the tongue portion.

There is a possibility of rubbing the front end of the tongue with the screw shaft by vibration or the like of the circulating part by being used at high speed as described above, or by clogging of the ball by an uneven load although the clogging is rare. At this occasion, damage in the case of bringing a resin and iron into contact with each other can be reduced by constituting the shape of the tongue by a shape substantially the same as the ball screw groove of the screw shaft and increasing the thickness t of the tongue.

Further, in the above-described embodiment, by forming the shape of the tongue portion 183 by a shape substantially the same as that of the ball screw groove 113 of the screw shaft 111 and arranging the tongue portion 183 with a clearance between the tongue portion 183 and the screw groove 113 of the screw shaft 111, even when the tongue portion 183 is assumedly brought into contact with the ball screw groove 113 of the screw shaft 111 by being applied with pressure from the balls 115, the area is wide and face pressure is restrained to be low and therefore, the tongue portion 183 can be prevented from being destructed. Further, damage in the case of bringing the tongue portion 183 into contact with the screw shaft 111 can be reduced.

Further, by constituting the angle α of intersecting the straight line A passing the ball scoop up point P of the ball 115 and the center 111o of the screw shaft 111 with the center line CL of the circulating member inserting hole 119a, 119b to be 45° through 80°, an apparent scoop up angle γ of the ball 115 becomes γ=10° through 45°. Thereby, the circulating member inserting hole 119a, 119b can be bored without being interfered with the ball screw groove 114 of the nut 112. In this case, when the tongue portion is constituted by the oval shape, also a length thereof can be prolonged.

When the apparent scoop up angle (angle between a straight line passing the center of the screw shaft and orthogonal to the center line of the circulating member inserting hole and a straight line passing the ball scoop up point and the center of the screw shaft) is equal to or larger than 20°, in a ball screw (particularly, ball screw having a larger ball diameter for use of an injection molding machine or the like) currently used, the circulating member inserting hole can be bored without being interfered with the ball screw groove of the nut. When the apparent scoop up angle is equal to or smaller than 20°, it is difficult to ensure a wall thickness of the nut or the ball circulating member by a sufficient wall thickness by being interfered with the ball screw groove of the nut. Further, when the apparent scoop up angle becomes equal to or larger than 45°, an angle of being converted upwardly is increased and therefore, the circulating member inserting hole is made to be difficult to establish as the ball circulating path. Therefore, the apparent scoop up angle of 10° through 45° is needed in order to bore the circulating member inserting hole without being interfered with the ball screw groove of the nut. By constituting the circulating member inserting hole by the oval shape and constituting a total of the oval shape as the tongue portion, the strength of the tongue portion can be increased. When the thickness of the tongue portion cannot be thickened by influence of a sink mark of a resin member, a thinned portion of the wall may be provided, however, it is preferable to ensure the thickness of the tongue portion by constituting the shape of the tongue portion by a shape of a rib.

Furthermore, by constituting the length L of the straight path portions 181a formed that the both end portions of the ball return path 181 to be equal to or larger than ½ of the diameter of the ball 115, the ball 115 is moved by constituting linear movement at a discontinuous (rattle at a vicinity of scoop up portion) portion and therefore, impact to a stepped difference is reduced and noise can be reduced.

That is, in the case of the ball screw, even in the tangential scoop up, when the ball is brought from a load region (region surrounded by ball screw grooves of the screw shaft and the nut) to the circulating path (at inside of the circulating part), a joint between parts is necessarily brought about. Although in the case of the tangential scoop up, in impacting the tongue, an incident angle thereof is proximate to 0° and the impact force is small, in shifting from the ball screw groove of the screw shaft to the front end of the tongue, the stepped difference is present. Although in the case of the tangential scoop up, it is preferable to provide a linear section as long as possible after the scoop up point, it is an object of the circulating part to return the ball to the opposed side, also a dimension of an outer shape of the ball screw cannot be increased more than necessary and therefore, an excessively long linear path cannot be adopted. However, in order to achieve an effect of the tangential scoop up, it is necessary to design a range in which the stepped difference is present (until the tongue rides over the front end portion) by a minimum linear path. In the case of the proposed tangential scoop up, the front end of the tongue is present at the position of about 0.5 time as much as the ball diameter from the scoop up point. Therefore, it is a necessary minimum condition to constitute the straight portion by 0.5 or more of the ball diameter at least.

Further, the invention is not limited to the above-described embodiment but various changes can be carried out within the range not deviated from the gist of the invention.

According to the invention, by forming the circulating member inserting hole in the oval shape along the longitudinal direction of the ball screw groove, even when the thickness of the tongue portion of the ball circulating member is thickened, the circulating member inserting hole can be prevented from being interfered with the ball screw groove and therefore, the strength of the tongue portion can be increased by thickening the thickness of the tongue portion of the ball circulating member even when a pitch of the ball screw groove is small or even when the ball screw groove is a multi-streak screw groove. Further, by constituting the thickness of the tongue portion along the length direction of the ball screw groove to be equal to or larger than ½ of the diameter of the ball, the tongue can be prevented from being destructed and high speed formation of the ball screw can be achieved.

According to the invention, by forming the shape of the tongue by the shape substantially the same as that of the ball screw groove of the screw shaft and arranging the tongue portion with the clearance between the tongue portion and the ball screw groove of the screw shaft, even when the tongue portion is assumedly brought into contact with the ball screw groove of the screw shaft by being applied with pressure from the ball, the area is wide and the face pressure is restrained to be low and therefore, the tongue portion can be prevented from being destructed.

According to the invention, by constituting the angle of intersecting the straight line passing the scoop up point of the ball scooped up from the ball screw groove of the screw shaft and the center of the screw shaft with the center line of the circulating member inserting hole to be 45° through 80°, the apparent scoop up angle of the ball becomes 10° through 45°. Thereby, the circulating member inserting hole can be bored without being interfered with the ball screw groove of the nut.

According to the invention, by constituting the length of the linear path portions formed at the both end portions of the ball return path to be equal to or larger than ½ of the diameter of the ball, the ball is moved by constituting linear movement at a discontinuous (rattle at a vicinity of scoop up portion) portion and therefore, impact to a stepped difference is reduced and noise can be reduced.

What is claimed is:

1. A ball screw apparatus, comprising:
a screw shaft having a screw groove in a spiral shape at an outer peripheral face thereof;
a nut having a screw groove in a spiral shape in correspondence with the screw groove of the screw shaft at an inner peripheral face thereof and screwed to the screw shaft, the nut having holes formed at an outer peripheral portion thereof;
a number of balls rollably charged into a rolling passage that is defined by the screw groove of the screw shaft and the screw groove of the nut; and
a ball circulating member formed substantially in a U-like shape and having end portions to be fitted to the holes to infinitely circulate the balls by scooping up the balls rolling on the rolling passage at a middle thereof and returning the balls to the rolling passage;
wherein the ball circulating member comprises a side cap which includes leg portions at both end portions thereof to be fitted into the holes, each of the leg portions containing at least one of a scooping up path for scooping up the balls and a returning path for returning the balls, the scooping up path and the retuning path being inclined with respect to respective outer peripheral faces of the leg portions;
the holes include a slot substantially in parallel with directions of the screw grooves of the screw shaft and the nut; and
the scooping up path and the returning path are directed substantially in a tangential direction of the screw shaft and inclined substantially toward a lead angle direction of the screw grooves of the screw shaft and the nut.

2. The ball screw apparatus according to claim 1, wherein a sidewall of the slot is used as a portion of a path for circulating the ball.

3. The ball screw apparatus according to claim 2, wherein a width dimension of the slot substantially the same as a diameter of the scooping up path and the returning path at a vicinity of a scoop up point where the balls are separated from the screw groove of the screw shaft.

4. The ball screw apparatus according to claim 1, wherein an apparent scoop up angle is set from 20° to 45°, wherein the apparent scoop up angle is an angle of scooping up the balls viewed in an axis direction of the, screw shaft at a scoop up point where the balls are separated from the screw groove of the screw shaft.

5. A ball screw, comprising:
a screw shaft having a ball screw groove formed on an outer peripheral face thereof;
a nut having a ball screw groove formed on an inner peripheral face thereof so as to be opposed to the ball screw groove of the screw shaft;
a number of balls provided between the ball screw groove of the screw shaft and the ball screw groove of the nut; and
a ball circulating member made of a resin for circulating the balls rolling between the ball screw grooves of the screw shaft and the nut in accordance with a rotational movement of the screw shaft or the nut at an exterior of the nut;
wherein the ball circulating member includes:
a tongue portion for scooping up the ball rolling between the ball screw grooves of the screw shaft and the nut in a direction of a tangential line that is in contact with a center track circle of the balls,
a ball return path for circulating the ball, and
a pair of return path inlet and outlet forming portions for forming inlet and outlet portions of the ball return path;
the nut includes a circulating member inserting hole fitted to the return path inlet and outlet forming portion; and
a circulating member inserting hole is formed in an oval shape that is longitudinal along a longitudinal direction of the ball screw groove; and
a thickness of the tongue portion along a length direction of the ball screw groove is equal to or larger than ½ of a diameter of the ball.

6. The ball screw according to claim 5, wherein a shape of the tongue portion is formed substantially the same as a shape of the ball screw groove of the screw shaft.

7. The ball screw according to claim 5, wherein an angle of intersecting a straight line passing a point of scooping up a ball scooped up from the screw groove of the screw shaft and a center of the screw shaft with a center line of the circulating member inserting hole is made to be 45° through 80°.

8. The ball screw according to claim 5, wherein the ball return path includes linear path portions having a length equal to or larger than ½ of the diameter of the ball at both end portions thereof.

9. A ball screw, comprising:
a screw shaft having a first screw groove in a spiral shape at an outer peripheral face thereof;
a nut having a second screw groove in a spiral shape at an inner peripheral face thereof in correspondence with the first screw groove and screwed to the screw shaft, the nut having slots;
a plurality of balls rollably provided into a rolling passage that is defined between the first screw groove and the second screw groove; and
a side cap having leg portions to be fitted into the slots to infinitely circulate the balls by scooping up the balls rolling on the rolling passage at a middle thereof and returning the balls to the rolling passage;
wherein the slots are longitudinal in a direction inclined toward an apparent scoop up angle so that a longitudinal direction of each of the slots is substantially equal to a tangent scooping up direction, wherein the apparent scoop up angle is an angle of scooping up the balls viewed in an axis direction of the screw shaft at a scoop up point where the balls are separated from the first screw groove; and
the apparent scoop up angle is set from 20° to 45°.

10. The ball screw according to claim 9, wherein the side cap includes a circulating path for circulating the balls, and a tongue portion for guiding the balls from the rolling passage to the circulating path;
the tongue portion extends in a direction substantially equal to the longitudinal direction of at least one of the slots; and
the tongue portion has a length equal to or more than a half of a diameter of each of the balls.

11. The ball screw according to claim 9, wherein the side cap has a linear portion extending from the scoop up point toward the circulating path; and
the linear portion has a length equal to or more than a half of a diameter of each of the balls.

* * * * *